United States Patent

Moravec

[15] 3,653,845

[45] Apr. 4, 1972

[54] SELF-SUPPORTING SCREEN DECK

[72] Inventor: Terrence D. Moravec, White Bear Lake, Minn.

[73] Assignee: Universal Oil Products Company, Des Plaines, Ill.

[22] Filed: Oct. 6, 1969

[21] Appl. No.: 863,799

[52] U.S. Cl. ..............................23/288 R, 210/293, 261/94
[51] Int. Cl. ........................................B01d 23/18, B01j 9/04
[58] Field of Search....................23/288, 289, 283, 284, 285, 23/288.3 S; 261/113, 94, 96, 97, 95, 98; 210/293, 541; 209/393; 52/246, 249

[56] References Cited

UNITED STATES PATENTS

| | | | |
|---|---|---|---|
| 2,712,929 | 7/1955 | Wilson | 261/113 |
| 2,750,174 | 6/1956 | Cogan | 261/113 |
| 2,860,860 | 11/1958 | Wilson | 261/113 |
| 2,931,469 | 4/1960 | Iglehart et al. | 52/246 |

Primary Examiner—Joseph Scovronek
Attorney—James R. Hoatson, Jr. and Philip T. Liggett

[57] ABSTRACT

A self-supporting, segmented, slotted deck having at least two screen segments that can be attached to each other along a support beam. In its preferred form the screen segments are of slotted construction, with the slots increasing in cross-sectional area from the top side of the screen surface to the lower side.

2 Claims, 2 Drawing Figures

Patented April 4, 1972

3,653,845

INVENTOR:
Terrence D. Moravec

BY: James R. Hoatson, Jr.
Philip T. Liggett
ATTORNEYS

SELF-SUPPORTING SCREEN DECK

This invention relates to an improved form of slotted deck or tray for use in contacting vessels. Such trays find particular application in catalyst vessels where they must support great loads of catalyst and/or distribution materials, such as sand, ion exchange resins, etc., and yet retain efficient screening surfaces.

Heretofore, a great deal difficulty has been experienced in installing a deck or tray into a contact vessel. Generally the present practice requires first, the permanent placement into the vessel of a sub-structure having the structural requirements necessary to support heavy loads; and second, the placement and welding of mesh or slotted screens on top of this substructure. Also, normally all the screen construction is done within the vessel under relatively close quarters. This general procedure has not proved to be the most desirable and efficient procedure.

Therefore, it is an object of this invention to provide for a deck system capable of supporting heavy loadings of contact materials.

Another object of this invention is to provide for a deck system that does not cause great pressure drops in the fluid flow through it.

Still another object of this invention is to provide for a deck that is susceptible to easy installation and removal techniques.

More particularly, it is an object of this invention to provide for a self-supporting, segmented, slotted deck that can be easily placed into a contact vessel through relatively small manways and once within the vessel, quickly assembled in a semi-permanent manner.

Accordingly, this invention provides a self-supporting, segmented deck comprising at least two wire screen segments, each being constructed of a plurality of closely spaced apart wires that are substantially parallel to each other and positioned in a plane to form a flat screen with slot type openings, said wires are supported in a fixed manner by connection to the lower side of said wires, of a plurality of spaced apart, support bars which extend transversely with respect to said wires. The resulting wire screen segments have at least one substantially straight inner edge portion in turn having a co-extensive beam support member permanently affixed thereto, and said resulting wire screen segments are attached to each other, laterally, along said beam support members in a semi-permanent manner. It is to be noted that the wire screen segments can be designed to withstand generally high weight loads. In other words, depending upon the size of the wire or rods making up the deck surface and the spacing of transverse support bars and wires used, there can be a transferal of loading to the screen edges. The support members which are affixed to the inner edges of the wire screen segments act as attachment pieces as well as supporting members. Generally, the beam support members are placed parallel to the wires so that when the wire segments are attached to each other, the resulting construction consists of groups of structural members alternately transversing one another, thus enhancing the strength of the screen segments.

Preferably, to add to the strength of the deck, a peripheral edge ring member is permanently affixed to the outer edge of the deck. This is done while the deck is in its segmented form, so that each wire segment includes all the necessary parts and is of a single unit. Thus, all that need be done to install a deck is to attach the wire screen segments together along the beam support members.

In a preferred form, the wires that form the slotted openings are wedge-shaped so as to form slots of non-clogging characteristics. The resulting screen deck is thus easier to clean and maintain when changing beds of contact material. Although, not to be limiting, the shape of the resulting deck will generally be circular, since such decks will be typically used in cylindrical contact chambers.

Reference to the accompanying drawings and the following description thereof, will serve to point out and more fully illustrate the design and construction of my invention, as well as assist in pointing out advantageous features in connection therewith:

Figure 1:
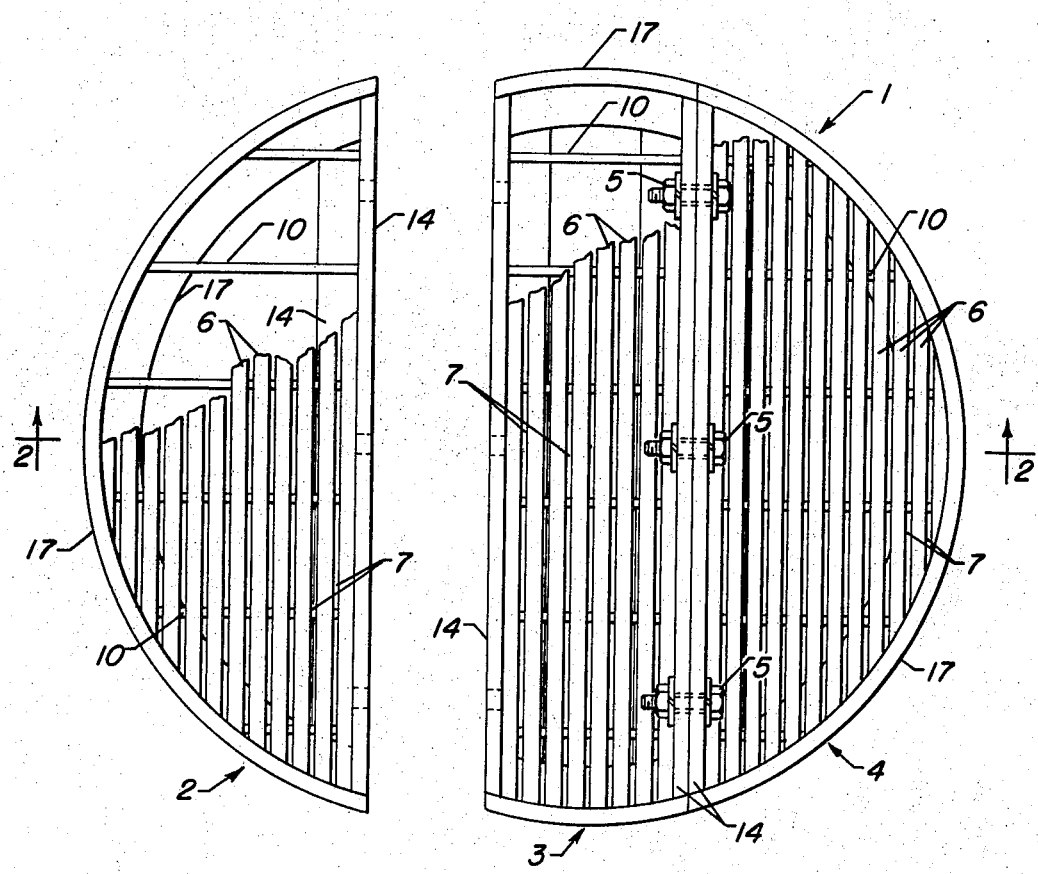
FIG. 1 is a schematic plan view of the preferred embodiment of the self-supporting deck, with one screen segment being shown separated from the main body thereof.
Figure 2:
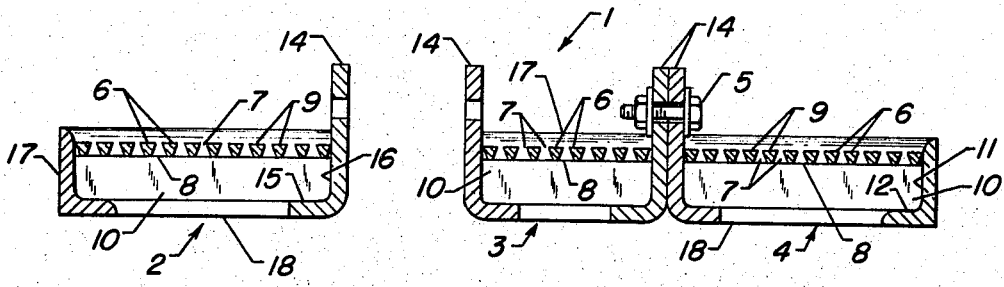
FIG. 2 is a sectional elevational view of the embodiment of FIG. 1, as taken along line 2—2.

Referring now to both FIGS. 1 and 2, there is shown a self-supporting deck 1 as a composite of three wire screen segments 2, 3 and 4. Wire screen segment 2 is shown as a removed segment so as to illustrate the construction of each segment. Wire screen segments 3 and 4 are shown as they would be in their composite state, attached to each other in a semi-permanent manner, as for example, by means of bolts 5.

It is to be noted that in this present embodiment, the shape of the deck 1 is circular in order to facilitate its use in a cylindrical vessel. However, this should not be a limiting factor, since different decks of various geometrical shapes are contemplated as being within the scope of this present improved construction and arrangement. In looking at the details of the wire screen segments 2, 3 and 4, it is seen that they are basically of a grid type of construction. In other words, each of the wire screen segments utilizes a multiplicity of special slot forming rods or wires 6 which are placed in a flat plane, parallel to each other at relatively close spacings. This spacing or distance between rods will vary in accordance with the use of the deck, but as an example, a distance of approximately 0.025 inches would be used for a vessel wherein sand is the contact material. Since the wires 6 lie in the same plane, the surface formed by them will be a flat, relatively clean surface, having continuous slot openings 7.

The shape of the wires 6 may vary with application, but the preferred form is wedge-shaped as illustrated in FIG. 2. The wedge-shaped wires 6 establish slots with varying cross-sectional area; i.e., slot opening 7 on the top side of the wire segment is narrower than the slot opening 8 on the lower side. This slot shape is a more efficient shape, because there are only two lines of contact with particles at the slot on the contacting surface 9, as opposed to two planes of contact. Since there are only two lines of contact, it becomes quite difficult for materials to wedge into place as would be the case if the contact region were two planes. The increasing cross-sectional size of the slots also aids in establishing a screen that will not cause significant pressure drops across it. The wires 6 are positioned transversely on top of spaced apart support bars 10 and permanently affixed to them, usually by resistance welding means. Of course, the shape and spacing of the support bars 10 will necessarily depend on strength requirements of the overall drain.

This unit, comprising wires 6 and support bars 10, is permanently affixed along its straight inner edge to a beam support member 14, usually by means of arc welding. Beam support 14, in its preferred form of an "L" cross section, allowing the unit to be affixed permanently along both horizontal surface 15 and vertical surface 16 of the member so as to provide for support in two directions. Generally the beam support member 14 will be parallel to the wires 6, establishing a structural stable unit where alternately the wires 6 transverse support bars 10 which in turn extend transversely with respect to the support members 14.

The wire screen segments 2, 3 and 4 are generally complete in this form and may be attached laterally to each other along beam support 14 as shown by the attachment of wire screen segments 3, and 4. However, if added strength requirements are called for, a peripheral edge ring 17 may be affixed to the outer edge of each segment 2, 3 and 4. The cross-sectional shape of the ring 17 may vary, but the preferred form is that of an "L", since the "L" shape has greater strength characteristics because both vertical surface 11 and horizontal surface 12 are used as surfaces of attachment. The edge ring 17 also establishes a peripheral lower surface 18 which is useful in the placement of the deck on its supporting surfaces.

Although the deck disclosed in this invention is self-supporting, it is only self-supporting in a limiting sense. Of necessity a contact vessel that utilizes this deck will have to be provided with a peripheral supporting surface so that surface 18 may be supported. Necessarily, this circumferential supporting surface will be designed to withstand the heavy weight loads that the screen must handle. Generally, no additional supporting members will be needed; however, in some cases when the deck is of a large size, one or two additional support members will have to be installed in the vessel, itself, so as to prevent structural failure of the deck. It is stressed that the use of such supports is minimal, and basically the resulting deck is self-supporting and can be utilized in its segmented form quite readily.

Smaller decks may require only two screen segments similar to segments 2 and 4, while larger decks, for use in vessels of diameters of as much as 12 feet, may require as many as 10 wire segments. The width of each segment is determined by the size of the manway that it is required to pass through and, additionally, by its transportability, and will generally fall between 10 and 20 inches. In its actual use each segment may be required to be introduced through a manway placed in its proper position over the circumferential supporting surface of the vessel, and attached semi-permanently to an adjacent wire screen segment.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed, as for example, the beam support member, instead of being "L" shaped, may be shaped as a channel member.

I claim as my invention:

1. In a self-supporting, segmented deck including a wire screen segment for use as a support for catalytic and distribution materials in contacting vessels, the combination comprising at least two of said segments including a plurality of spaced apart, wedge-shaped wires, said wires being disposed substantially parallel to each other and positioned in a plane to form a flat screen having narrow slot openings at the top side thereof and wide slot openings on the lower side thereof, a plurality of spaced apart support bars positioned transversely with respect to said wires, each of said segments having two beam support members with said wires positioned therebetween, each of said members comprising an "L" shaped configuration in cross-section, said wires being affixed to said support bars and said support bars being affixed to the vertical and horizontal surfaces of said beam support members, a peripheral edge ring means of L-shape configuration having both vertically and horizontally disposed surfaces, said segments being attached to said vertical and horizontal surfaces of said ring means, the facing vertical surfaces of said "L" shaped configuration of said beam support members having means for optional attachment and detachment with respect to an adjacent segment for ready installation and removal through relatively small vessel manways.

2. The self-supporting deck of claim 1 further characterized in that said resulting deck is of a circular shape.

* * * * *